United States Patent
Lighty et al.

(10) Patent No.: US 10,527,098 B1
(45) Date of Patent: Jan. 7, 2020

(54) SYSTEMS AND METHODS OF OIL DISTRIBUTION FOR A BEARING

(71) Applicant: Rolls-Royce Corporation, Indianapolis, IN (US)

(72) Inventors: Kerry Lighty, Plainfield, IN (US); Andrew Schwendenmann, Avon, IN (US); Eric McClellan, Avon, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 0 days.

(21) Appl. No.: 16/146,494

(22) Filed: Sep. 28, 2018

(51) Int. Cl.
| F16C 33/66 | (2006.01) |
| F16C 33/58 | (2006.01) |
| F01D 25/18 | (2006.01) |
| F16N 9/02 | (2006.01) |

(52) U.S. Cl.
CPC .......... F16C 33/6677 (2013.01); F01D 25/18 (2013.01); F16C 33/586 (2013.01); F16C 33/667 (2013.01); F16C 33/6651 (2013.01); F16C 33/6681 (2013.01); F16N 9/02 (2013.01); F16C 2360/23 (2013.01)

(58) Field of Classification Search
CPC ................ F16C 33/6677; F16C 33/586; F16C 33/6651; F16C 33/667; F16C 33/6681; F16C 2360/23
See application file for complete search history.

(56) References Cited

U.S. PATENT DOCUMENTS

| 3,915,521 | A | | 10/1975 | Young | |
| 4,334,720 | A | * | 6/1982 | Signer | F16C 33/60 |
| | | | | | 384/475 |
| 4,384,749 | A | * | 5/1983 | Schaefer | F16C 19/26 |
| | | | | | 384/465 |
| 5,106,209 | A | * | 4/1992 | Atkinson | F16C 33/60 |
| | | | | | 384/462 |
| 5,183,342 | A | * | 2/1993 | Daiber | F01D 25/18 |
| | | | | | 384/462 |
| 6,682,222 | B2 | | 1/2004 | Fisher | |
| 6,976,827 | B2 | | 12/2005 | Bruno et al. | |
| 7,931,407 | B2 | | 4/2011 | Begin et al. | |
| 8,464,835 | B2 | | 6/2013 | Munson | |
| 8,985,277 | B2 | | 3/2015 | Hetherington et al. | |
| 9,541,007 | B2 | * | 1/2017 | McCune | F02C 7/36 |
| 2003/0039421 | A1 | | 2/2003 | Fisher et al. | |

(Continued)

FOREIGN PATENT DOCUMENTS

EP 2657463 A1 10/2013

*Primary Examiner* — Thomas R Hannon
(74) *Attorney, Agent, or Firm* — Duane Morris LLP

(57) ABSTRACT

Systems and methods are presented for directing oil to a bearing of a rotatable shaft. A system comprises a bearing race, a nozzle, and an oil catcher. The bearing race defines a first radial passage and a second radial passage axially displaced from the first radial passage. The nozzle is arranged to eject a stream of oil under pressure toward the shaft. The oil catcher is positioned between the bearing race and the shaft. The oil catcher comprises an annular catching flange at least partly defining a catchment region. The oil catcher defines a first channel extending from the catchment region to the first radial passage of the bearing race and a second channel extending from the catchment region to the second radial passage of the bearing race.

21 Claims, 3 Drawing Sheets

(56) References Cited

U.S. PATENT DOCUMENTS

| | | | |
|---|---|---|---|
| 2013/0149141 A1* | 6/2013 | Siniawski | F01D 25/164 415/229 |
| 2013/0283758 A1 | 10/2013 | Wotzak | |
| 2015/0219152 A1 | 8/2015 | Ward | |
| 2017/0234222 A1* | 8/2017 | Schwendenmann | F02C 7/06 184/6.11 |

* cited by examiner

SYSTEMS AND METHODS OF OIL DISTRIBUTION FOR A BEARING

CROSS-REFERENCE TO RELATED APPLICATIONS

This application is related to concurrently filed U.S. patent application Ser. No. 16/146,563, entitled "SPLINED OIL CATCHER," filed Sep. 28, 2018, inventors: Kerry Lighty and Brian Fish; U.S. patent application Ser. No. 16/146,660, entitled "OIL JET IN A CONFINED AXIAL SPACE," filed Sep. 28, 2018, inventors: Kerry Lighty and David Farnum; and U.S. patent application Ser. No. 16/146,719, entitled "DRAIN ARRANGEMENT FOR A SQUEEZE FILM DAMPER," filed Sep. 28, 2018, inventors: Kerry Lighty, David Farnum, Daniel Feinstein and Joseph Swift. The entirety of these applications are herein incorporated by reference.

BACKGROUND

A rotating machine typically comprises a rotatable shaft supported by one or more bearings. A shaft bearing permits rotation of the shaft while preventing or minimizing radial movements of the shaft. During operation, shaft bearings are locations within a rotating machine that are subject to high friction and therefore tend to generate a large volume of heat. Shaft bearings typically require lubrication and heat removal, functions that may be performed by flowing oil across the bearing rolling contact surfaces. Managing the flow of oil across a bearing is essential to ensuring safe and efficient operation of the rotating machine.

SUMMARY

According to some aspects of the present disclosure, a system is disclosed for directing oil to a bearing of a rotatable shaft. The system comprises a bearing race, a nozzle, and an oil catcher. The bearing race is positioned between the bearing and the shaft. The bearing race defines a first radial passage and a second radial passage axially displaced from the first radial passage. The nozzle is axially displaced from the bearing and positioned radially outward from the shaft. The nozzle is arranged to eject a stream of oil under pressure toward the shaft. The oil catcher is positioned between the bearing race and the shaft. The oil catcher comprises an annular catching flange disposed axially intermediate the nozzle and the bearing. The catching flange at least partly defines a catchment region. The oil catcher defines a first channel extending from the catchment region to the first radial passage of the bearing race and a second channel extending from the catchment region to the second radial passage of the bearing race.

In some embodiments a volume of oil supplied to the first radial passage is asymmetric to a volume of oil supplied to the second radial passage. In some embodiments the volume of oil supplied to the first radial passage is greater than the volume of oil supplied to the second radial passage. In some embodiments the volume of oil supplied to the first radial passage is less than the volume of oil supplied to the second radial passage.

In some embodiments the system further comprises a plurality of first channels extending from the catchment region to the first radial passage and a plurality of second channels extending from the catchment region to the second radial passage. In some embodiments the number of either first channels or second channels is greater than the number of the other of first channels or second channels. In some embodiments the system further comprises a plurality of first channels extending from the catchment region to the first radial passage and a plurality of second channels extending from the catchment region to the second radial passage. In some embodiments the volume of either first channels or second channels is greater than the volume of the other of first channels or second channels.

In some embodiments the system further comprises a deflecting body coupled to the shaft axially forward of the oil catcher, the deflecting body having a deflecting surface positioned to receive a stream of oil incident thereon and deflect the stream toward the catching flange.

In some embodiments the deflecting surface deflects the stream of oil axially rearward. In some embodiments the deflecting surface deflects the stream of oil radially outward. In some embodiments the shaft is rotating away from the stream of oil at the location of incidence. In some embodiments the oil catcher is positioned between a pair of axial stops of the shaft to prevent movement of the oil catcher relative to the shaft. In some embodiments the catching flange comprises an axial member and a radial member, the radial member extending radially inward from the axial member. In some embodiments the oil catcher defines at least one race stop for preventing axial motion of the bearing race relative to the oil catcher in at least one axial direction.

According to further aspects of the present disclosure, a method is disclosed of cooling a bearing of a rotatable shaft. The method comprises supplying an oil stream ejected from a nozzle toward the shaft; catching the oil stream with an annular catching flange of an oil catcher, the annular catching flange disposed axially intermediate the nozzle and the bearing; directing oil caught by the catching flange through a first channel defined by the oil catcher to a first radial passage through a bearing race at a first axial position along the shaft; and directing oil caught by the catching flange through a second channel defined by the oil catcher to a second radial passage through a bearing race at a second axial position along the shaft.

In some embodiments the method further comprises deflecting the oil stream with a deflecting surface prior to catching the oil stream. In some embodiments the deflecting surface deflects the stream of oil radially outward. In some embodiments the method further comprises flowing the oil through the first radial passage or second radial passage and around the bearing.

In some embodiments the method further comprises collecting oil in a sump after the oil is directed through one of the first radial passage and second radial passage. In some embodiments the shaft is rotating away from the stream of oil at the location of incidence. In some embodiments the method further comprises preventing axial movement of the bearing race relative to the oil catcher in at least one axial direction with at least one race stop.

BRIEF DESCRIPTION OF THE DRAWINGS

The following will be apparent from elements of the figures, which are provided for illustrative purposes.

Figure 1:
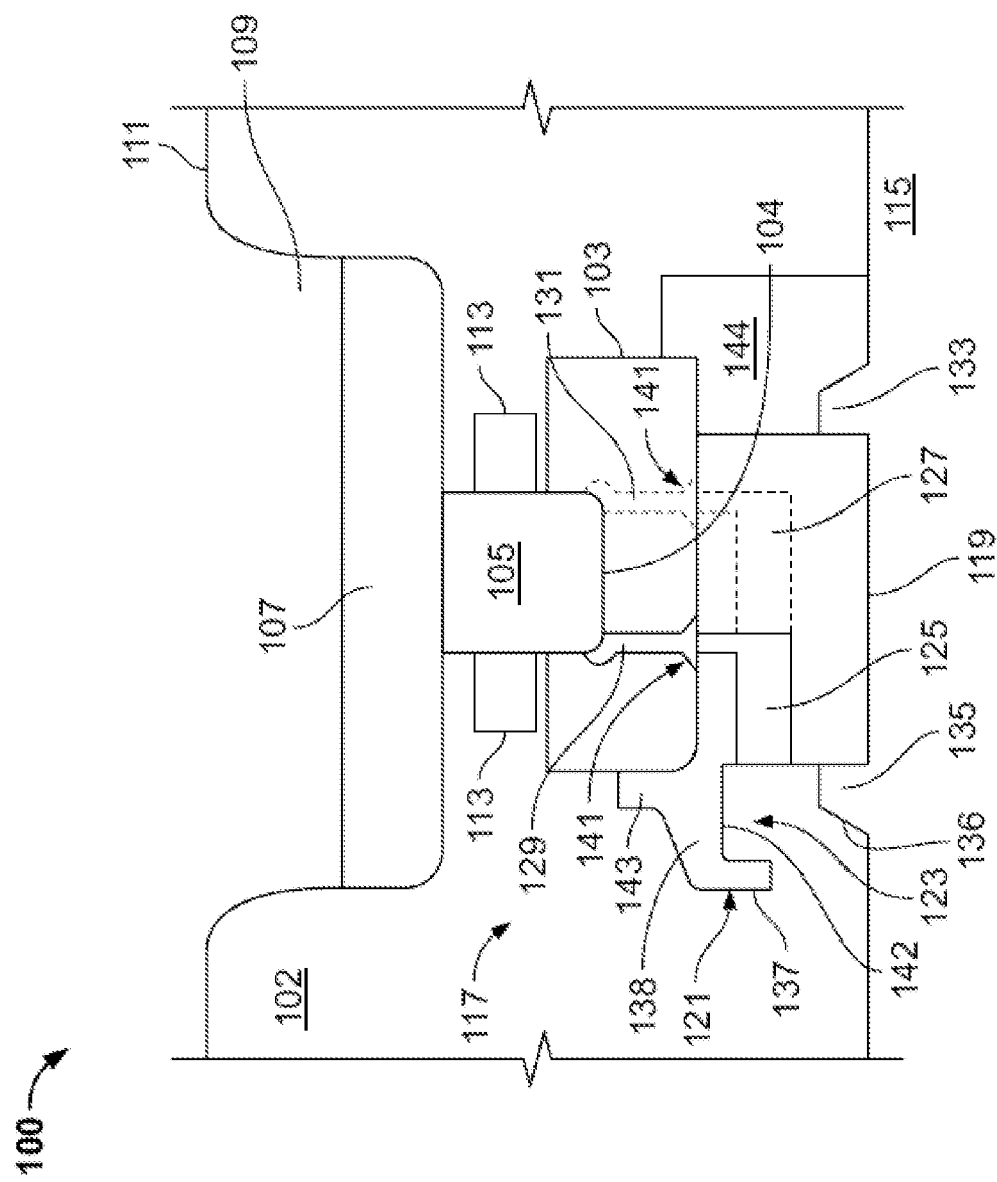
FIG. 1 is a cross sectional schematic view of an oil catcher and bearing arrangement in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

The present disclosure is directed to systems and methods of oil distribution for a shaft bearing. An oil catcher is positioned between the shaft and the shaft bearing. The oil catcher may comprise a catching flange and a body that defines one or more channels. The channels direct oil flow from a catchment region at least partly defined by the catching flange to radial passages that lead to the bearing. The channels may lead to different radial passages at different axial positions along the shaft. The body of the oil catcher may define channels of varying count and/or size to control the volume of oil flowing to each radial passage, and thus control the flow of oil across various portions of the bearing.

FIG. 1 is a cross sectional schematic view of a system 100 of oil distribution in accordance with some embodiments of the present disclosure. The system 100 comprises a rotatable shaft 115, a bearing 105, and an oil catcher 117. The shaft 115 defines an axis of rotation for the rotating machine, which may be, for example, a gas turbine engine. A sump 102 defined at least in part by a sump housing 111 may be positioned about the shaft 115. The system 100 directs oil to a bearing 105 of a rotatable shaft 115.

A bearing 105 may be positioned in the sump 102. The bearing may be positioned between the shaft 115 and the sump housing 111. The bearing may be a roller bearing. The bearing may be axially bounded by a bearing cage 113.

The bearing 105 may be radially bounded by a pair of bearing races. An inner race 103 may be positioned radially inward from the bearing 105 and an outer race 107 may be positioned radially outward from the bearing 105. The inner race 103 may define one or more radial passages extending in a radial direction through the inner race 103. The inner race 103 may have a geometry that prevents or reduces axial movement of the bearing 105 relative to shaft 115. The inner race 103 may define a groove 104, and the bearing 105 may be positioned in the groove 104.

The radial passages defined by the inner race 103 may extend from a radially inner surface of the inner race 103 to the groove 104. More specifically, a first radial passage 129 may extend from a radially inner surface of the inner race 103 to the groove 104 at a first axial position along the shaft 115. A second radial passage 131 may extend from a radially inner surface of the inner race 103 to the groove 104 at a second axial position along the shaft 115. The second radial passage 131 is axially displaced from the first radial passage 129. The first radial passage 129 and second radial passage 131 may extend in a substantially radial direction.

In some embodiments, the inner race 103 defines a reservoir 141 at the radially inner portion of one or more of the radial passages 129, 131. A reservoir 141 may be a widening of the passage. The reservoir 141 may be annular and service more than one radial passage, or may be discrete about the passage. The reservoir 141 may assist with consistency of the oil flow during operation of the rotating machine.

A plurality of first radial passages 129 may be spaced about the circumference of the annular inner race 103 at the first axial position along the shaft 115. A plurality of second radial passages 131 may be spaced about the circumference of the annular inner race 103 at the second axial position along the shaft 115. The first radial passage(s) 129 may be positioned to direct oil flow onto the bearing 105 at a first position. The second radial passage(s) 131 may be positioned to direct oil flow onto the bearing 105 at a second position. Oil flow over the bearing 105 from the first radial passage(s) 129 and second radial passage(s) 131 may be sufficient to lubricate and cool the bearing 105.

An outer race 107 may be positioned radially outward from the bearing 105. The outer race 107 may be annular. The outer race 107 may interface with one or more bearing pedestals 109 that extend from the sump housing 111 to the outer race 107. The one or more bearing pedestals 109 may be spaced about the circumference of the outer race 107.

An oil catcher 117 may be disposed between the inner race 103 and the shaft 115. The oil catcher 117 may comprise an annular body 119 and an annular catching flange 121. The oil catcher 117 may be a unitary member. The oil catcher may be positioned axially displaced from a nozzle 140 (see FIG. 2).

The catching flange 121 may extend from the body 119 and may comprise an axial member 138 and a radial member 137. The radial member 137 may extend radially inward from the axial member 138. The catching flange 121 at least partly defines a catchment region 123 for catching oil. The catching flange 121 may be positioned axially intermediate the nozzle 140 and bearing 105. The radially inward edge of the radial member 137 of catching flange 121 may at least partly define an opening or entrance to the catchment region 123. The radial member 137 may be spaced from the shaft 115 a sufficient distance to permit the ingress of oil into the catchment region 113, and may have a radial dimension sufficient to prevent or reduce escape of oil from the catchment region 113.

The body 119 may define one or more channels that extend from the catchment region 123 to one of the radial passages through the inner race 103. For example, the body 119 may define a first channel 125 extending from the catchment region 123 to the first radial passage 129. The body 119 may define a second channel 127 extending from the catchment region 123 to the second radial passage 131.

A plurality of first channels 125 may be spaced about the circumference of the body 119, with each channel of the plurality of first channels 125 extending from the catchment region 123 to the first axial position along the shaft where a plurality of first radial passages 129 may be positioned. A plurality of second channels 127 may be spaced about the circumference of the body 119, with each channel of the plurality of second channels 127 extending from the catchment region 123 to the second axial position along the shaft where a plurality of second radial passages 131 may be positioned. In some embodiments the body 119 defines at least four first channels 125 and at least four second channels 127. In some embodiments the body 119 defines ten or more channels.

In some embodiments the oil catcher 105 may further comprise a forward race stop 143 positioned along a radially outer surface of the oil catcher 105. The forward race stop 143 may be annular, or may be formed at one or more discrete circumferential locations. The forward race stop 143 prevents axially forward excursions of the inner race 103, thus assisting in maintaining axial alignment between the first channels 125 and first radial passages 129, and between the second channels 127 and second radial passages 131. In some embodiments the forward race stop 143 may assist in maintaining axial alignment between the first channels 125 and a reservoir 141 associated with the first radial passages 129, and between the second channels 127 and a reservoir 141 associated with second radial passages 131.

In some embodiments system 100 may further comprise an aft race stop 144. The aft race stop 144 may be annular, or may be formed at one or more discrete circumferential locations. The aft race stop 144 prevents axially rearward excursions of the inner race 103, thus assisting in maintaining axial alignment between the first channels 125 and first radial passages 129, and between the second channels 127 and second radial passages 131. In some embodiments the aft race stop 144 may assist in maintaining axial alignment between the first channels 125 and a reservoir 141 associated with the first radial passages 129, and between the second channels 127 and a reservoir 141 associated with second radial passages 131. In some embodiments the aft race stop 144 may be formed as a portion of the oil catcher 105.

In some embodiments the reservoir 141 associated with the first radial passage 129 is an annular reservoir 141 fed by at least five first channels 125. The first channels 125 direct oil from the catchment region 123 to the annular reservoir 141, and oil flows from the reservoir 141 to one or more first radial passages 129 through the inner race 103. Oil flow exiting the first radial passages 129 flows over the bearing to provide lubrication and cooling.

In some embodiments the reservoir 141 associated with the second radial passage 131 is an annular reservoir 141 fed by at least five second channels 127. The second channels 127 direct oil from the catchment region 123 to the annular reservoir 141, and oil flows from the reservoir 141 to one or more second radial passages 131 through the inner race 103. Oil flow exiting the second radial passages 131 flows over the bearing to provide lubrication and cooling.

In embodiments lacking a reservoir 141 associated with the first radial passage 129 and/or second radial passage 131, a clocking method may be utilized to ensure alignment of first channels 125 to first radial passages 129 and second channels 127 to second radial passages 131 during rotation.

The oil catcher 117 may be fit to or coupled to the shaft 115. The oil catcher may be positioned between one or more axial stops, such as a forward axial stop 135 and an aft axial stop 133, to prevent axial movement of the oil catcher 117 relative to the shaft 115.

An axial stop positioned proximate the catching flange 121 and/or catchment region 123, such as forward axial stop 135, may comprise a deflecting body having a deflecting surface 136 for deflecting a stream of oil toward the catchment region 123. The deflecting surface 136 may be positioned to receive a stream of oil incident thereon and deflect the stream toward the catching flange 121. The deflecting surface 136 may face radially outward and axially rearward, and may be angled relative to the shaft 115.

In some embodiments a back plate (not shown) may be attached by welding, brazing, interference fit or other mechanical means proximate each channel 125, 127 to ensure oil does not flow through the oil catcher 117 in an axial direction. During manufacture of the oil catcher 105, each of the channels 125, 127 may be machined (i.e. drilled) from right to left as presented in FIG. 1. A back plate may therefore be necessary to prevent oil flow completely through the oil catcher 105 in an axial direction.

Figure 2:
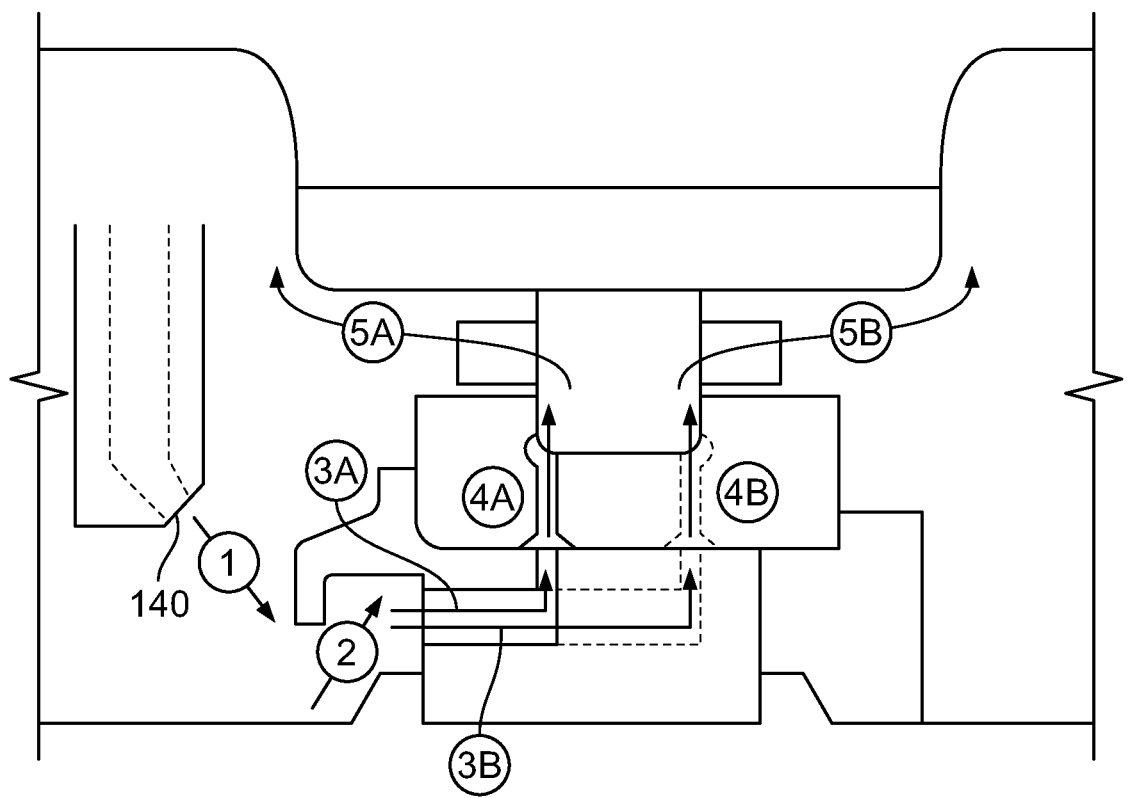
FIG. 2 is a cross sectional schematic view showing the flow of oil through an oil catcher and bearing arrangement in accordance with some embodiments of the present disclosure.

In operation, an oil stream is captured by the catching flange 121, directed through the channels 125, 127 of the oil catcher 117 and radial passages 129, 131 of the inner race 103, and delivered to the bearing 105. FIG. 2 provides a cross sectional schematic view of the flow of oil through system 100.

A stream of oil is ejected under pressure from a nozzle 140, as indicated by Arrow 1 of FIG. 2. The nozzle 140 may be axially displaced from the bearing 105 and positioned radially outward of the shaft 115. The nozzle 140 illustrated in FIG. 2 is axially forward the bearing 105. The stream of oil may be directed toward the shaft 115 and/or toward the oil catcher 117.

To aid in oil capture efficiency, the stream of oil may be angled such that the trajectory of the stream is in the same direction as the rotation of shaft 115. Thus the stream of oil may be shot "over the horizon" of the shaft 115. The shaft 115 may be rotating away from the stream of oil at the location of incidence. Angling the stream of oil in such a manner reduces the angle of incidence with the oil catcher 117 and thus minimizes oil splash and deflection.

The steam of oil may be deflected by deflecting surface 136 of the forward axial stop 135, as indicated at Arrow 2. The stream of oil may be deflected toward the catchment region 123. The stream of oil may be deflected in a radially outward and/or axially aft direction.

Oil enters the annular catchment region 123 and then flows into one of the first channel 125 and second channel 127 under hydraulic and/or centrifugal forces. In some embodiments, the oil may pool in the catchment region 123 prior to entering one of the channels 125, 127. For example, where the opening of a channel 125, 127 is radially offset from the axial member 138 of the catching flange 121, a catchment reservoir 142 may be defined between the body 119 and the catching flange 121. Oil may pool in the catchment reservoir 142 until a sufficient volume of oil is established to enter one of the channels 125, 127.

Oil flowing through the first channel 125 is directed to a first radial passage 129 at a first axial position along the shaft 115. Oil flowing through the second channel 127 is directed to a second radial passage 131 at a second axial position along the shaft 115. The oil in the first channel 125 may be directed to one of a plurality of first radial passages 129. The oil in the second channel 127 may be directed to one of a plurality of second radial passages 131. The flow of oil through the first channel 125 is shown as Arrow 3A, where the flow of oil through the second channel 127 is shown as Arrow 3B.

Oil exits from one of the first channel 125 and second channel 127 and enters a respective one of the first radial passage 129 or second radial passage 131. Oil may be conveyed through one of the first radial passage 129 and second radial passage 131 by hydraulic and/or centrifugal forces. Oil may enter a respective one of the reservoirs 141 associated with the first radial passage 129 and second radial passage 131. The flow of oil through the first radial passage 129 and second radial passage 131 is shown as Arrows 4A and 4B in FIG. 2.

The oil flows indicated at Arrows A3, 3B, 4A, and 4B may be optimized depending on their application. For example, the volume of oil supplied to the first radial passage 129 may be asymmetric to the volume of oil supplied to the second radial passage 131. In some embodiments the volume of oil supplied to the first radial passage 129 may be greater than the volume of oil supplied to the second radial passage 131, while in other embodiments the volume of oil supplied to the first radial passage 129 may be less than the volume of oil supplied to the second radial passage 131.

The asymmetry between the volume of oil supplied to the first radial passage 129 and the volume of oil supplied to the second radial passage 131 may be achieved by, for example, a differing count of similarly sized channels through the oil catcher, differing volumes of the channels (i.e. from differing channel diameters), or a combination of the two. For example, in embodiments having a plurality of first channels 125 extending from the catchment region 123 to the first radial passage 129 and a plurality of second channels 127 extending from the catchment region 123 to the second radial passage 131, the number (count) of first channels 125 may be greater than or less than the number of second channels 127. A greater volume of oil may be supplied to the radial passage having the greater number of channels.

Similarly, in embodiments having a plurality of first channels 125 extending from the catchment region 123 to the first radial passage 129 and a plurality of second channels 127 extending from the catchment region 123 to the second radial passage 131, the volume and/or diameter of first channels 125 may be greater than or less than the volume and/or diameter of second channels 127. A greater volume of oil may be supplied to the radial passage having the greater channel volume and/or diameter.

Oil exiting the first radial passage 129 flows over the bearing 105 at a first axial position along the shaft 115, as indicated by Arrow 5A. Oil exiting the second radial passage 131 flows over the bearing 105 at a second axial position along the shaft 115, as indicated by Arrow 5B. The oil flows of Arrows 5A and 5B lubricate and remove heat from the bearing 105. After flowing over the bearing 105, the oil is directed into the sump 102. The oil may flow over the outer race 107. Upon entering the sump 102, the oil may be scavenged by a lubrication and scavenge system.

Although the embodiment illustrated in FIG. 1 and discussed herein includes first and second radial passages at a first and second axial position along the shaft respectively, the present disclosure is not so limited. Additional embodiments may have additional radial passages at additional axial positions along the shaft. Further, additional channels are contemplated between the catchment region and the additional radial passages in order to supply oil to the additional passages.

Figure 3:
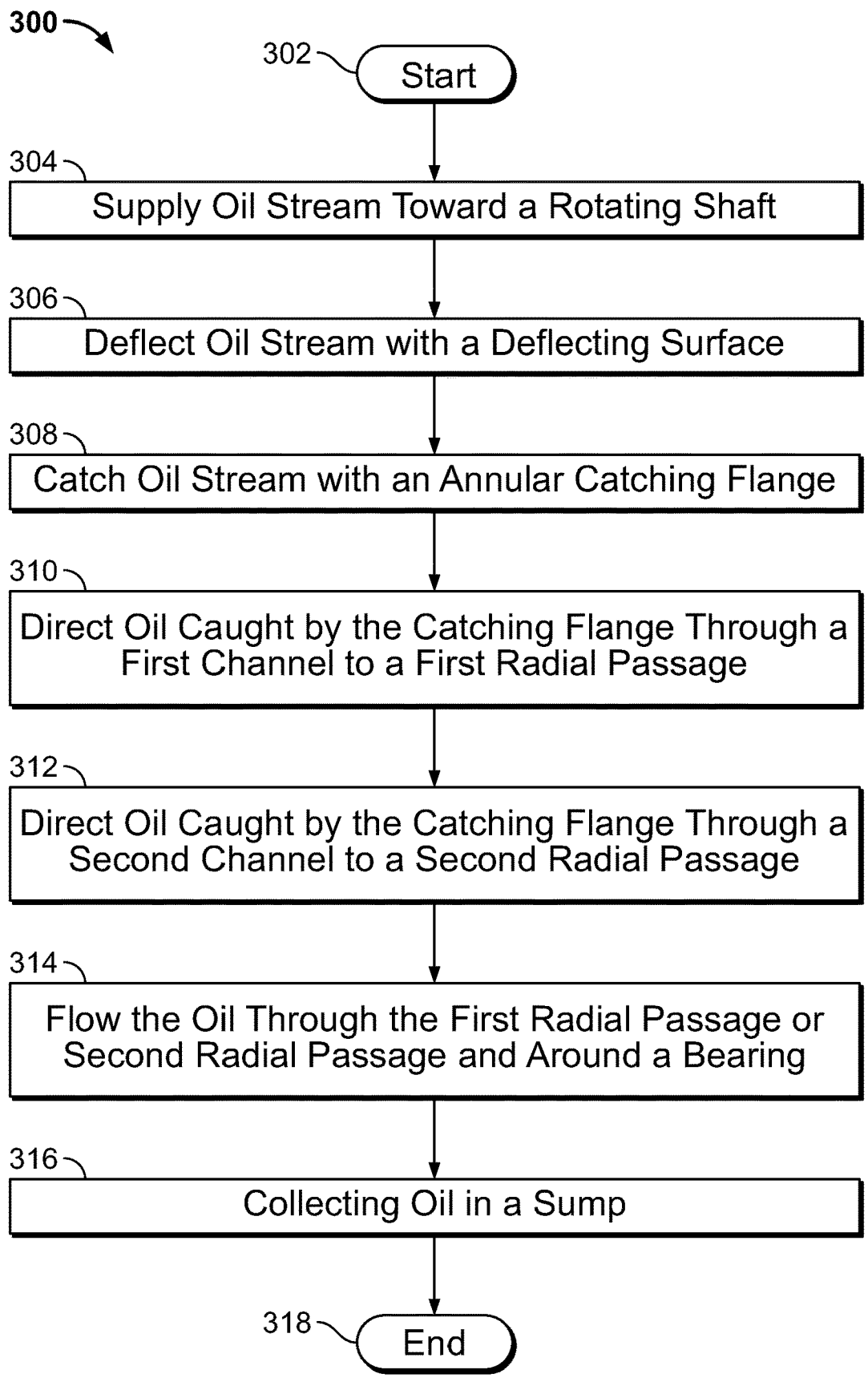
FIG. 3 is a flow diagram of a method in accordance with some embodiments of the present disclosure.

The present disclosure additionally provides methods of lubricating and/or cooling a bearing of a rotatable shaft. One such method 300 is illustrated in the flow diagram of FIG. 3. Method 300 begins at Block 302.

At Block 304, a stream of oil may be supplied. The stream of oil may be ejected under pressure from a nozzle 140 toward a rotating shaft 115 and/or an oil catcher 117. The nozzle 140 may be axially spaced from the bearing 105 and radially spaced from the shaft 115.

At Block 306, the stream of oil may be deflected by a deflecting surface 136. The deflecting surface 136 may be an angled surface of an axial stop 135 or similar member. The axial stop 135 may prevent motion of the oil catcher 117 relative to the shaft 115 in an axial direction. The stream of oil may be deflected radially outward and/or axially rearward. The stream of oil may be deflected toward a catching flange 121 and/or a catchment region 123.

At Block 308 the stream of oil is caught with an annular catching flange 121 and may be retained in a catchment region 123. The stream of oil may have been deflected at Block 306 or may not have been deflected. The annular catching flange 121 may comprise an axial member 138 and a radial member 137 extending radially inward from the axial member 138. The stream of oil may be collected and retained in the catchment region 123 prior to proceeding to Block 310.

At Block 310 oil caught by the catching flange 121 may be directed through a first channel 125 to a first radial passage 129. The first channel 125 may extend from and be in fluid communication with the catchment region 123 and the first radial passage 129. Oil may flow through the first channel 125 under hydraulic and/or centrifugal forces. The first channel 125 delivers the oil to a first radial passage 129 at a first axial location along the shaft 115. The oil catcher 117 may define a plurality of first channels 125 directing oil to the first radial passage 129.

At Block 312 oil caught by the catching flange 121 may be directed through a second channel 127 to a second radial passage 131. The second channel 125 may extend from and be in fluid communication with the catchment region 123 and the second radial passage 131. Oil may flow through the second channel 127 under hydraulic and/or centrifugal forces. The second channel 127 delivers the oil to a second radial passage 131 at a second axial location along the shaft 115. The oil catcher 117 may define a plurality of second channels 127 directing oil to the second radial passage 131.

Blocks 310 and 312 may be performed in parallel. The volume of oil directed to the first radial passage 129 may be asymmetric the volume of oil directed to the second radial passage 131. A plurality of first channels 125 directing oil to the first radial passage(s) 129 may have a higher or lower number of channels as compared to a plurality of second channels 127 directing oil to the second radial passage(s) 131. A plurality of first channels 125 directing oil to the first radial passage(s) 129 may have a higher or lower volume and/or diameter of channels as compared to a plurality of second channels 127 directing oil to the second radial passage(s) 131.

At Block 314 oil flows through one or both of the first radial passage 129 and second radial passage 131. The oil may be directed from one or both of the first radial passage 129 and second radial passage 131 over the bearing 105. The flow of oil from the first radial passage 129 and second radial passage 131 over the bearing may lubricate and/or remove heat from the bearing. Oil flow from the first radial passage 129 may be at a first axial position along the shaft 115, and oil flow from the second radial passage 131 may be at a second axial position along the shaft 115.

At Block 316 the oil may be collected in a sump 102 after it flows over the bearing. The sump 102 may be defined in part by a sump housing 111 that extends at least partly around the bearing 105 and shaft 115.

Method 300 ends at Block 318.

The present disclosure provides numerous advantages over existing systems and methods of distributing oil in a shaft bearing. The disclosed oil catcher is able to catch a stream of oil that may be deflected, shot over the shaft horizon, or otherwise directed toward the shaft and oil catcher. Captured oil may be directed to two or more axial positions along the shaft via two or more channels defined by the oil catcher.

The volume of oil directed to each axial position may be optimized based on lubrication and cooling requirements. For example, the volume of oil sent to a forward axial position may be greater than or less than the volume of oil sent to an aft axial position. The number, size, volume, dimensions, and/or diameters of the channels may determine the volume of oil sent to each axial position.

Although examples are illustrated and described herein, embodiments are nevertheless not limited to the details shown, since various modifications and structural changes may be made therein by those of ordinary skill within the scope and range of equivalents of the claims.

What is claimed is:

1. A system for directing oil to a bearing of a rotatable shaft comprising:
   a bearing race positioned between the bearing and the shaft, the bearing race defining a first radial passage and a second radial passage axially displaced from the first radial passage;
   a nozzle axially displaced from the bearing and positioned radially outward from the shaft, the nozzle arranged to eject a stream of oil under pressure toward the shaft; and
   an oil catcher positioned between the bearing race and the shaft, the oil catcher comprising an annular catching flange disposed axially intermediate the nozzle and the bearing, the catching flange at least partly defining a catchment region, the oil catcher defining a first channel extending from the catchment region to the first radial passage of the bearing race and a second channel circumferentially spaced from the first channel, the second channel extending from the catchment region to the second radial passage of the bearing race.

2. The system of claim 1 wherein a volume of oil supplied to the first radial passage is asymmetric to a volume of oil supplied to the second radial passage.

3. The system of claim 2 wherein the volume of oil supplied to the first radial passage is greater than the volume of oil supplied to the second radial passage.

4. The system of claim 2 wherein the volume of oil supplied to the first radial passage is less than the volume of oil supplied to the second radial passage.

5. The system of claim 2 further comprising:
   a plurality of first channels extending from the catchment region to the first radial passage and a plurality of second channels extending from the catchment region to the second radial passage;
   wherein the number of either first channels or second channels is greater than the number of the other of first channels or second channels, and wherein each of said second channels is circumferentially spaced from each of said first channels.

6. The system of claim 2 further comprising:
   a plurality of first channels extending from the catchment region to the first radial passage and a plurality of second channels extending from the catchment region to the second radial passage;
   wherein the volume of either first channels or second channels is greater than the volume of the other of first channels or second channels.

7. The system of claim 1 further comprising:
   a deflecting body coupled to the shaft axially displaced from the oil catcher, said deflecting body having a deflecting surface positioned to receive a stream of oil incident thereon and deflect the stream toward the catching flange.

8. The system of claim 7 wherein the deflecting surface deflects the stream of oil axially.

9. The system of claim 7 wherein the deflecting surface deflects the stream of oil radially outward.

10. The system of claim 1 wherein the shaft is rotating away from the stream of oil at a location of incidence.

11. The system of claim 1 wherein the oil catcher is positioned between a pair of axial stops of the shaft to prevent movement of the oil catcher relative to the shaft.

12. The system of claim 1 wherein the catching flange comprises an axial member and a radial member, the radial member extending radially inward from the axial member.

13. The system of claim 1 wherein the oil catcher defines at least one race stop for preventing axial motion of the bearing race relative to the oil catcher in at least one axial direction.

14. A method of cooling a bearing of a rotatable shaft comprising:
   supplying an oil stream ejected from a nozzle toward the shaft;
   catching the oil stream with an annular catching flange of an oil catcher, the annular catching flange disposed axially intermediate the nozzle and the bearing;
   directing oil caught by the catching flange through a first channel defined by the oil catcher to a first radial passage through a bearing race at a first axial position along the shaft; and
   directing oil caught by the catching flange through a second channel defined by the oil catcher and circumferentially spaced from the first channel to a second radial passage through a bearing race at a second axial position along the shaft.

15. The method of claim 14 further comprising:
   deflecting the oil stream with a deflecting surface prior to catching the oil stream.

16. The method of claim 15 wherein the deflecting surface deflects the stream of oil radially outward.

17. The method of claim 14 further comprising:
   flowing the oil through the first radial passage or second radial passage and around the bearing.

18. The method of claim 14 further comprising:
   collecting oil in a sump after the oil is directed through one of the first radial passage and second radial passage.

19. The method of claim 14 wherein the shaft is rotating away from the stream of oil at a location of incidence.

20. The method of claim 14 further comprising:
   preventing axial movement of the bearing race relative to the oil catcher in at least one axial direction with at least one race stop.

21. A system for directing oil to a bearing of a rotatable shaft comprising:
   a bearing race positioned between the bearing and the shaft, the bearing race defining a first radial passage and a second radial passage axially displaced from the first radial passage;
   a nozzle axially displaced from the bearing and positioned radially outward from the shaft, the nozzle arranged to eject a stream of oil under pressure toward the shaft; and
   an oil catcher positioned between the bearing race and the shaft, the oil catcher comprising an annular catching flange disposed axially intermediate the nozzle and the bearing, the catching flange at least partly defining a catchment region, the oil catcher defining a first channel extending from the catchment region to the first radial passage of the bearing race and a second channel extending from the catchment region to the second radial passage of the bearing race;
   wherein a volume of oil supplied to the first radial passage is asymmetric to a volume of oil supplied to the second radial passage.

* * * * *